US012625013B2

(12) United States Patent
Wagner et al.

(10) Patent No.: US 12,625,013 B2
(45) Date of Patent: May 12, 2026

(54) METHOD FOR DETERMINING THE TEMPERATURE IN A JOINING ZONE

(71) Applicant: Technische Universität Chemnitz Körperschaft des Öffentlichen Rechts, Chemnitz (DE)

(72) Inventors: Guntram Wagner, Otterberg (DE); Andreas Gester, Chemnitz (DE); Marco Thomä, Chemnitz (DE)

(73) Assignee: Technische Universität Chemnitz

( * ) Notice: Subject to any disclaimer, the term of this patent is extended or adjusted under 35 U.S.C. 154(b) by 313 days.

(21) Appl. No.: 18/290,292

(22) PCT Filed: Jun. 10, 2022

(86) PCT No.: PCT/DE2022/100436
§ 371 (c)(1),
(2) Date: Nov. 11, 2023

(87) PCT Pub. No.: WO2023/280340
PCT Pub. Date: Jan. 12, 2023

(65) Prior Publication Data
US 2024/0230423 A1      Jul. 11, 2024

(30) Foreign Application Priority Data

Jul. 8, 2021    (DE) .......................... 102021117697.2

(51) Int. Cl.
*G01K 7/08*        (2006.01)
*B23K 20/10*       (2006.01)
*B23K 103/18*      (2006.01)

(52) U.S. Cl.
CPC ................ *G01K 7/08* (2013.01); *B23K 20/10* (2013.01); *B23K 2103/18* (2018.08)

(58) Field of Classification Search
None
See application file for complete search history.

(56) References Cited

U.S. PATENT DOCUMENTS 4,529,115 A * 7/1985 Renshaw ............... B23K 20/10
                                                    228/1.1
8,702,882 B2 * 4/2014 Cai ..................... B29C 66/1122
                                                    156/367

FOREIGN PATENT DOCUMENTS

DE            2210855 C2    9/1972
DE             252778 A1   12/1987
          (Continued)

OTHER PUBLICATIONS

Cheng et al., Microstructure and mechanical properties of ultrasonic welded copper to aluminum cables joints, Nonferrous Metals Society of China, Issue 33, p. 3027-3038. (Year: 2022).*

(Continued)

*Primary Examiner* — Devang R Patel
(74) *Attorney, Agent, or Firm* — Von Rohrscheidt Patents

(57)            ABSTRACT

The invention relates to a method for determining the temperature in a joining zone in a vibration welding process, wherein a first joining partner (1) and a second joining partner (2) are welded together, characterised in that the first and second joining partners (1, 2) act as a thermocouple, wherein, using a first measuring element (5) contacting the first joining partner (1) at a cold site (3) and a second measuring element (10) contacting the second joining partner at a distance from a hot site (8), a potential difference (P1) between the first and second joining partners (1, 2) is detected during the welding process: wherein the second measuring element (10) has a higher temperature than the temperature of the cold site (3) in the region of contact with the second joining partner (2) and has a material of the same type as the second joining partner (2): the potential difference (P1) is compared with material-specific calibration data and processed using a data processing system (7) and the welding process is controlled according to the determined potential difference (P1): the first joining partner (1) is in the (Continued)

form of a multi-wire cable: the first measuring element (5) is in the form of a measuring line, which is connected to the first joining partner (1) by its first end and connected to a data processing system (7) at a measuring point (6) by its second end: the first joining partner (1) and/or the first measuring element (5) are made from aluminium; the second joining partner (2) and/or the second measuring element (10) are made from copper; and the temperature of the cold site corresponds to the ambient temperature of approx. 20° and the contacting takes place in the region of the hot site (8) at a temperature greater than the ambient temperature.

3 Claims, 2 Drawing Sheets

(56) References Cited

FOREIGN PATENT DOCUMENTS

| | | |
|---|---|---|
| DE | 4206584 C2 | 3/1994 |
| DE | 102010050387 B4 | 6/2011 |
| DE | 102013107637 A1 | 1/2015 |
| DE | 102016110228 A1 | 12/2016 |
| JP | 2006159277 A | 6/2006 |
| JP | 4541121 B2 | 9/2010 |

OTHER PUBLICATIONS

Elangovan et al., Temperature and stress distribution in ultrasonic metal welding—An FEA-based study, Journal of materials processing technology, Issue 209, p. 1143-1150. (Year: 2009).*

Hazlett & Ambekar, Additional Studies on Interface Temperatures and Bonding Mechanisms of Ultrasonic Welds, Weld. Res. Suppl. 49, 196-200. (Year: 1970).*

Dushkes S Z et al. "Measuring Temperature Rise During Ultrasonic Bonding", IBM Technical Disclosure Bulletin, vol. 12, No. 7, Dec. 1, 1969 (Dec. 1, 1969), p. 1044, XP001343148 The whole document.

* cited by examiner

METHOD FOR DETERMINING THE TEMPERATURE IN A JOINING ZONE

CROSS REFERENCE TO RELATED APPLICATIONS

This application is the U.S. national stage of International Application No. PCT/DE2022/100436, filed on 2022 Jun. 10. The international application claims the priority of DE 102021117697.2 filed on 2021 Jul. 8; all applications are incorporated by reference herein in their entirety.

BACKGROUND

The invention relates to a method for determining the temperature in a joining zone in a vibration welding process and is used in particular for ultrasonic metal welding of dissimilar materials.

Ultrasonic welding is a type of pressure welding process in which the joining partners are joined together by a spot temperature increase. Friction is generated by means of an ultrasonic oscillation, which is used in combination with a static pressure to increase the temperature in a controlled manner. This process has been used in microelectronics and packaging technology for decades. Another important application is the joining of stranded aluminum cables to copper conductors (terminals) in the manufacture of electric vehicles. For process control and quality assurance, it therefore makes sense to monitor the temperature in the joining zone and use this to identify good and bad welds without destructive testing methods.

Thermocouples (tactile) as well as thermal imaging cameras and pyrometers (optical) are frequently used to determine the temperature in the joining zone during metal ultrasonic welding. These methods are affected by large measurement inaccuracies. Optical temperature measurement involves looking at the joining partners from the outside, so that only superficial temperature changes can be recorded. This means that hardly any conclusions can be drawn about the internal processes and the internal temperature of the joining zone, since the joining zone is covered by the welding tools and the joining partners themselves. Thus, only qualitative statements on the temperature are possible.

In tactile temperature measurement, the measured temperature depends on the placement of the thermocouples.

Thermocouples function according to the so-called Seebeck effect, i.e. if a temperature difference occurs along the length of an electrical conductor, a potential difference occurs between the warmer and colder ends of the conductor and a current flows. The magnitude of the potential difference is specific to each material. If two different electrical conductor materials are brought into contact and heated at their contact point, a potential difference can thus be measured between the cold ends of the two conductors due to the electromotive force. This correlates directly with the temperature at the hot junction. Typically, this effect is used in thermocouples, which often consist of pairings of NiCr/Ni, CuNi/Fe, etc.

Since localized melting can occur during metal ultrasonic welding, it is hardly possible to determine the joining zone temperature reproducibly and precisely. Moreover, thermocouples must be inserted manually by the operator. The thermocouple represents a foreign body in the joining zone, which can negatively influence the welding process. In addition, the thermocouple is destroyed in the welding process. Due to these facts, the insertion of thermocouples into the joining zone is uneconomical for process monitoring.

A method for temperature control during resistance welding is disclosed in the publication DD 2 52 778 A1, in which two measuring elements are used. During the welding process, the thermoelectric voltage superimposed on the welding voltage between two electrodes is measured between one of the electrodes and the materials to be joined, or direct measurement is carried out between workpieces of different materials in such a way that one measuring lead is conductively connected to one of the workpieces and a second measuring lead is brought into contact either with the lower electrode or with the upper workpiece.

The publication JP 2006-159 277 A discloses an ultrasonic welding process with temperature measurement by a thermocouple, in which an aluminum cable is welded to a bronze base. However, the design of the thermocouple is not disclosed in the publication.

The publication DE 22 10 855 C2 describes a method and a device for directly joining metal parts together and the application of the method. The metal parts are joined by energy pulses which are generated by vibration and are in the sonic or ultrasonic range. The method can be used, among other things, to join copper components to aluminum components. During the joining process, temperatures in excess of 1000° C. can occur, although these are narrowly localized. This prevents large-area heating of the components. The temperature is measured by means of a thermocouple.

The energy in the joint, measured as thermoelectric potential, can be displayed at the interface of two layers to be joined.

The publication DE 42 06 584 C2 describes a device and a method for joining two components by means of ultrasound. According to the method, a temperature measurement is carried out in the immediate vicinity of the welding point in order to determine the optimum welding parameters. With the aid of the temperature measurement as a reference variable, a control loop is thus established. Both non-contacting and contacting systems can be used for temperature measurement, although preference is given to the contacting versions for reasons of cost and because of the greater measuring accuracy. In this context, thermocouples located in the sonotrode tip are to be used. However, it is also possible for the thermocouple to be guided on the weld seam.

The publication DE 10 2010 050 387 A1 describes a method and a system for online quality monitoring and control of a vibration welding process. According to the method, data of the joint is acquired by means of sensors positioned in relation to welding interfaces of a workpiece. The measured values are first determined and then compared with measured values stored in a database. The result of this comparison is used to optimize the welding process parameters.

In this case, the measured values do not provide concrete physical quantities (temperature, force, electric current, etc.), but features are classified. The sum of these features allows conclusions to be drawn that characterize the quality of the weld produced. The measured values are recorded and compared with data records in the database online, i.e. during the welding process. It is thus possible to carry out process optimization during joining.

SUMMARY

It is the object of the invention to develop a method for temperature determination in a joining zone, which provide a non-destructive process control and quality assurance with regard to the temperature of the welding point for pressure welding processes.

This object is solved with the features of the first claim. Advantageous designs result from the subclaims.

DETAILED DESCRIPTION

The method is used to determine the temperature in a joining zone in a vibration welding process, wherein a first joining partner and a second joining partner are welded together, wherein the first and second joining partners act as thermocouples and a potential difference between the first and second joining partners is detected during the welding process by means of a first measuring element which is in contact with the first joining partner at a cold junction and a second measuring element which is in contact with the second joining partner at a distance from a hot junction, wherein the second measuring element has, in the region of contact with the second joining partner, a temperature which is higher than the temperature of the cold junction and a material of the same type as the second joining partner, wherein the potential difference is matched with material-specific calibration data and is processed by means of a data processing system, and in that the welding process is controlled according to the determined potential difference, the first joining partner is designed in the form of a stranded cable, the first measuring element is in the form of a measuring lead which is connected with its first end to the first joining partner and with its second end at a measuring point to a data processing system, the first joining partner and/or the first measuring element are made of aluminum, the second joining partner and/or the second measuring element are made of copper, and the temperature of the cold junction corresponds to the ambient temperature of approx. 20° and in that the contacting in the area of the hot junction takes place at a temperature higher than the ambient temperature. Preferably, the potential difference is adjusted with material-specific calibration data so that the determined data are processed by means of a data processing system.

Particularly preferably, the welding process can be controlled on the basis of the determined potential difference, wherein the vibration welding process is, in an advantageous design, a metal ultrasonic welding process.

Advantageously, the second joining partner is formed in the form of a stranded cable and/or in the form of a solid body. Therefore, both joining partners can also be designed in the form of solid bodies or in the form of stranded cables. Furthermore, the method can also be used for joining partner geometries that deviate from this, such as sheet metal/sheet metal or foil/foil. Contacting can also be much easier here due to the significantly lower deformation of the joining partners.

Preferably, the temperature of the cold junction is essentially the same as the ambient temperature. The second contact is arranged in the region of the hot junction, wherein a temperature higher than the ambient temperature is present in the area of the second contact. According to the invention, the first joining partner and the first measuring element are made of aluminum. According to the invention, the second joining partner and the second measuring element are made of copper. However, other non-metallic material combinations are also suitable, for example aluminum/nickel, nickel/copper, or the like.

The device for determining the temperature in a joining zone in a vibration welding process, wherein a first joining partner and a second joining partner can be welded to one another, has a first contact of the first joining partner with a first measuring element at a first cold junction and a second contact of the second joining partner with a second measuring element at a distance from a hot junction, wherein the joining partners are connected to data processing via the measuring elements. The second measuring element also has a material of the same type as the second joining partner.

Preferably, the device is designed such that a second cold junction is arranged between the second measuring element and the data processing unit.

In a first design, the first measuring element is in the form of a measuring lead. Alternatively, the first measuring element can be in the form of a resilient measuring tip. The resilient measuring tip can be fed to the welding system by means of a side slide.

BRIEF DESCRIPTION OF THE DRAWINGS

The invention is explained in more detail below with reference to an exemplary embodiment and associated drawings, wherein.

DETAILED DESCRIPTION OF THE PREFERRED EMBODIMENTS

Figure 1:
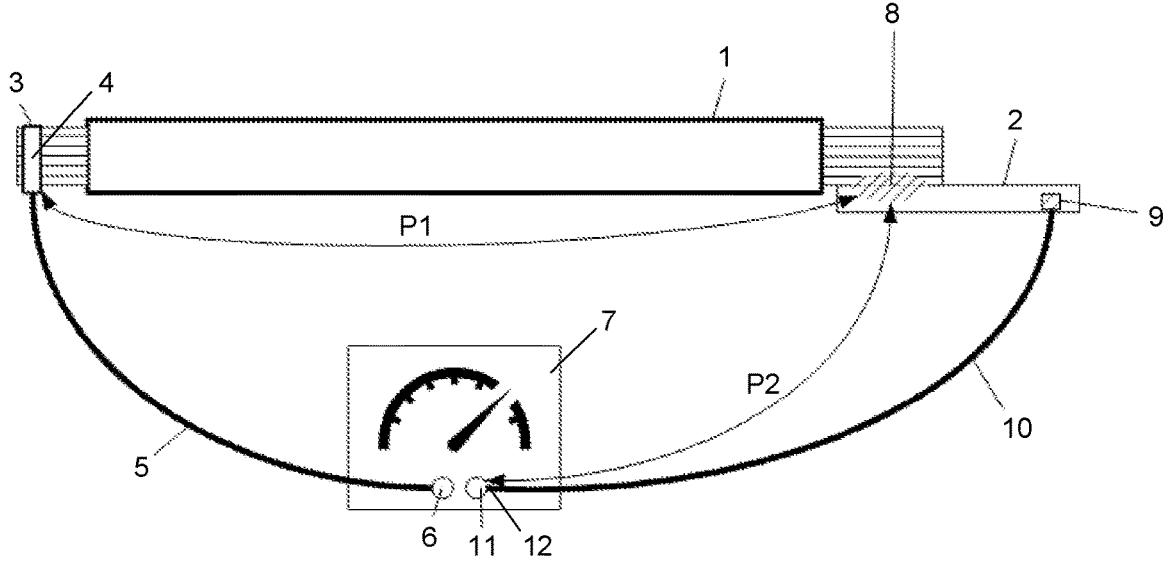
FIG. 1 shows a schematic representation of the method according to the invention.

The method is illustrated in a schematic diagram in FIG. 1. According to the exemplary embodiments, a first joining partner 1 in the form of an aluminum stranded cable is welded to a second joining partner 2 in the form of a copper terminal. The welding process is preferably a metal ultrasonic welding process.

The first joining partner 1 has a first contact 4 with a first measuring element 5 at a first cold junction 3 at a temperature of approx. 20° C. (ambient temperature). The first measuring element 5 is in the form of a measuring lead, wherein the material can be selected as desired. In this exemplary embodiment, the contact is made by means of a steel lead. The measuring lead is connected at its first end to the first joining partner 1 and at its second end to a data processing system 7 at a measuring point 6. In the joining region of the first and second joining partners 1, 2, a hot junction 8 is formed during the welding process, which has a temperature of approx. 250° C. A second contact 9 of the second measuring element 10 is arranged at a distance from the hot junction 8, wherein the second contact 9 also has a temperature of approx. 250° C. in accordance with the hot junction 8. The second measuring element 10 is also in the form of a measuring lead, wherein the second measuring element 10 has the same material as the second joining partner 2. The second measuring lead 10 is connected at its first end to the second joining partner 2 and at its second end to a data processing system 7 at a second measuring point 11. In the design, the measuring lead is formed of copper. In this way, loss-free heat transfer can be achieved between the copper terminal and the copper measuring lead.

The temperature difference between the first cold junction 3 of the first joining partner 1 and the hot junction 8 as well as the second contact 9 creates a potential difference P1 between the warmer and colder ends of the joining partners, causing a current to flow. This current flow is detected and processed by means of the data processing system 7.

Since a second cold junction 12 is formed at the second measuring point 11 due to the difference in material between the copper lead and the measuring device, a potential difference P2 can also be determined between the second contact 9 and the measuring point 11. The temperature of the second cold junction 12 is similar to the first cold junction 3 at approx. 20° C.

In the following, the potential difference P1 recorded by the data processing system 7 is compared with material-specific calibration data stored in the data processing system 7 and processed further. The welding process can be controlled on the basis of the potential difference P1 and the resulting data.

Figure 2:
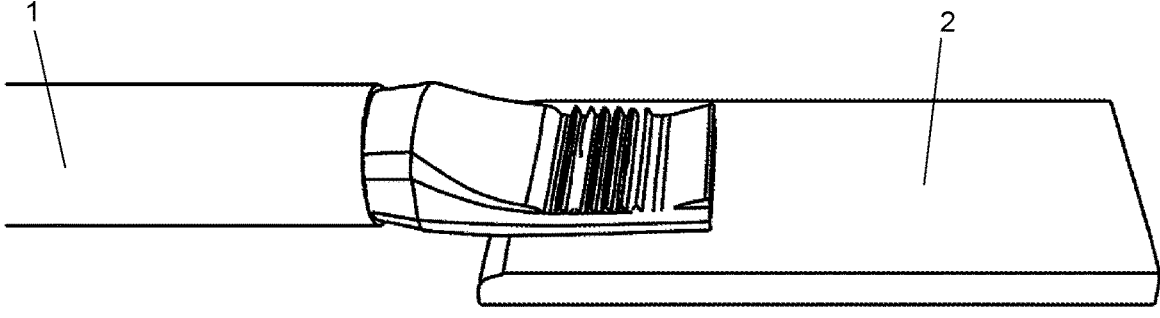
FIG. 2 shows a metal-ultrasonic welded composite of an aluminum cable and a copper terminal.

FIG. 2 shows a first joining partner 1 and a second joining partner 2 after the joining process. The first joining partner 1 is in the form of a stranded aluminum cable. The second joining partner 2 is in the form of a solid body made of copper. The joint was made by means of metal ultrasonic welding.

Figure 3:
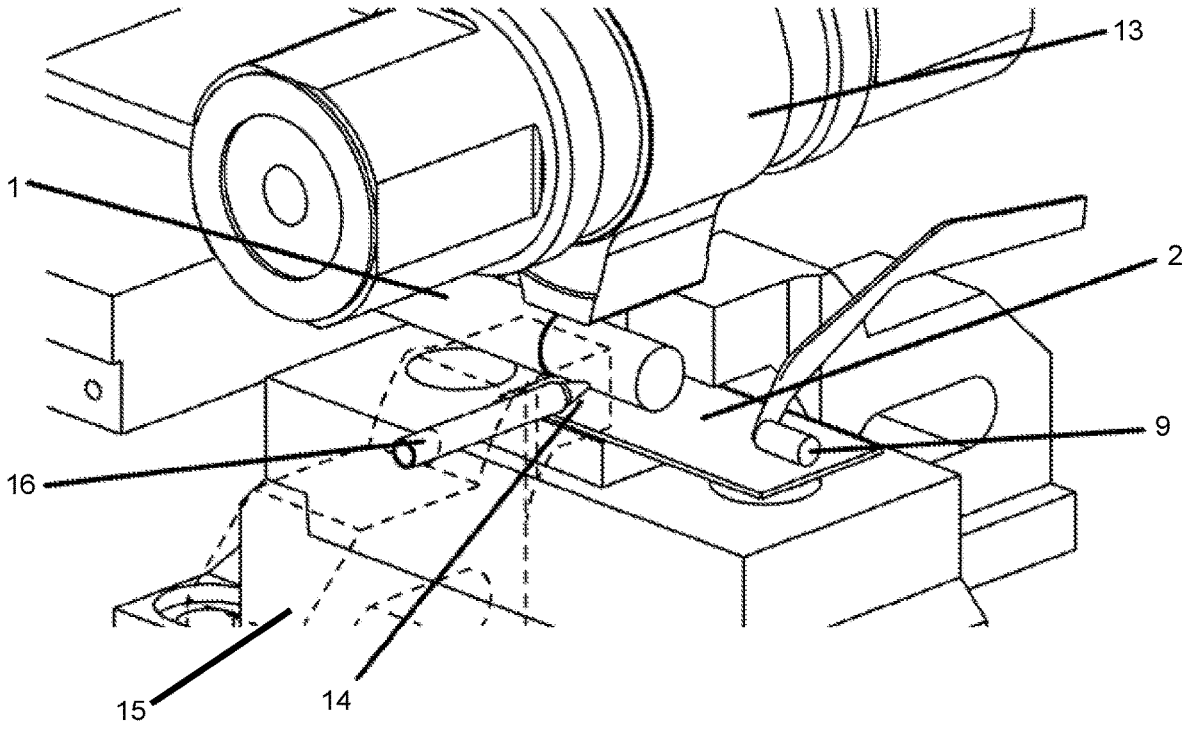
FIG. 3 shows a device for measuring a potential difference.

A device for determining the temperature in a joining zone in a vibration welding process is shown in FIG. 3. Welding is performed by means of a sonotrode 13 arranged above the first and second joining partners 1, 2. For industrial production, contacting can be automated. The contact 9 of the second joining partner 2 (copper terminal) is implemented in such a way that the second joining partner 2 is fixed during the joining process. Since the first joining partner 1 (stranded aluminum cable) is subject to strong plastic deformation in the welding process and thus to a change in geometry, a spring-loaded measuring tip 14 made of aluminum is inserted laterally into the first joining partner 1 via a side slide 15 (hold-down device) of the welding system. Alternatively, a spring-loaded contacting to the head side of the stranded cable or the attachment of a measuring cable to the remote and cold end (cold junction) of the stranded cable would be conceivable. The measuring tip 14 is formed of pure aluminum and has an insulating ceramic tube 16 around the measuring tip 14.

LIST OF REFERENCE NUMERALS

1 First joining partner
2 Second joining partner
3 First cold junction
4 First contact
5 First measuring element
6 First measuring point
7 Data processing system
8 Hot junction
9 Second contact
10 Second measuring element
11 Second measuring point
12 Second cold junction
13 Measuring tip
14 Side slide

The invention claimed is:

1. Method for determining a temperature in a joining zone in a vibration welding process, wherein a first joining partner (1) and a second joining partner (2) are welded together, characterized in that the first and second joining partners (1, 2) act as thermocouples, wherein a potential difference (P1) between the first and second joining partners (1, 2) is detected during the welding process by means of a first measuring element (5), which is in contact with the first joining partner (1) at a cold junction (3), and a second measuring element (10), which is in contact with the second joining partner (2) at a distance from a hot junction (8), wherein the second measuring element (10) has, in the region of contact (9) with the second joining partner (2), a temperature which is higher than the temperature of the cold junction (3) and a material of the same type as the second joining partner (2), in that the potential difference (P1) is matched with material-specific calibration data and is processed by means of a data processing system (7), and in that the welding process is controlled according to the determined potential difference (P1), in that the first joining partner (1) is designed in the form of a stranded cable, in that the first measuring element (5) is designed as a measuring lead which is connected at its first end to the first joining partner (1) and at its second end at a measuring point (6) to the data processing system (7), in that the second measuring element (1) is designed as a measuring lead which is connected at its first end to the second joining partner (2) and at its second end at a second measuring point (11) to the data processing system (7), in that the first joining partner (1) and the first measuring element (5) are made of aluminum, in that the second joining partner (2) and the second measuring element (10) are made of copper, in that the temperature of the cold junction corresponds to the ambient temperature of approximately 20° C. and in that the contacting in the region of the hot junction (8) takes place at a temperature higher than the ambient temperature.

2. Method according to claim 1, characterized in that the vibration welding process is metal ultrasonic welding.

3. Method according to claim 1, characterized in that the second joining partner (2) is designed in the form of a stranded cable and/or a solid body.

* * * * *